United States Patent [19]

Lee

[11] 3,970,955

[45] July 20, 1976

[54] GAS DYNAMIC-TRANSFER CHEMICAL LASER

[76] Inventor: Lester A. Lee, 405 River Road Drive, Oxon Hill, Md. 20022

[22] Filed: Dec. 6, 1974

[21] Appl. No.: 530,259

[52] U.S. Cl.............................. 331/94.5 G; 330/4.3
[51] Int. Cl.² .......................................... H01S 3/22
[58] Field of Search......................... 149/23, 46, 92; 331/94.5; 330/4.3

[56] References Cited
OTHER PUBLICATIONS

Forkey et al., Chemical Abstracts, vol. 71, 1969, Abstract No. 49069j, p. 303.

Primary Examiner—Robert J. Webster

[57] ABSTRACT

A gas dynamic-transfer chemical laser is formed by burning a halogenated and deuterated tetrazole and expanding the combustion products through a supersonic nozzle and injecting into the expanding products, a secondary stream of cold $D_2$ or cold $H_2$.

3 Claims, No Drawings

GAS DYNAMIC-TRANSFER CHEMICAL LASER

The invention described herein may be manufactured and used by or for the Government of the United States of America for Governmental purposes without the payment of any royalties thereon or therefor.

BACKGROUND OF THE INVENTION

This invention relates to lasers and more specifically to gas dynamic-transfer chemical lasers using a secondary fuel.

Laser beams and methods for the production of laser beams are well-known as evidenced by U.S. patent application Ser. No. 530,258 of Beckert et al filed Dec. 6, 1974, now U.S. Pat. No. 3,940,298, and U.S. patent application Ser. No. 530,260 of Lee et al filed on even date herewith, both of said applications being incorporated herein by reference.

Gas dynamic and chemical lasers are similar in that both depend upon the competition between stimulated emission and radiationless relaxation processes. Stimulated emission predominates when a population inversion exists between two energy levels.

In chemical lasers, the products of highly energetic chemical reactions are formed directly in vibrationally or electronically excited states with the upper levels preferentially populated, whereas in gas dynamic lasers, an initially hot gas in thermodynamic equilibrium is rapidly expanded through a supersonic nozzle, and inversion occurs by differential relaxation processes in the nonequilibrium nozzle flow.

One of the best gas dynamic lasers expands a gas of 89% $N_2$, 10% $CO_2$, 1% $H_2O$. This gas has the disadvantage of being virtually impossible to generate by the combustion of non-gaseous fuels and oxidizers. At the present time, most GDL systems depend upon bottle or cryogenic gases, which require complicated valve systems along with other complicated and bulky equipment.

Recently, continuous wave operation of 10.6 in $HCl-CO_2$, $HBr-CO_2$, $DF-CO_2$ chemical lasers has been described. The laser emission is believed to be the result of upper $CO_2$ laser level pumped by vibrational-rotational energy transferred from excited HCl, HBr, DF and HF molecules formed by chemical reactions.

In the $DF-CO_2$ system, F. (provided by partial dissociaton of $F_2$ by photolysis, thermolysis, reaction of $F_2$ with NO. or thermal dissociation of $SF_6$ or $NF_3$) is mixed with $CO_2$, $N_2$ and $D_2$. The rapid and efficient chain reactions, $F. + D_2 \quad DF* + D.$ and $D. + F_2 \quad DF* + F.$ are driven to completion as the mixture flows along a Teflon reaction tube. The present chemical laser systems have a disadvantage in that generation of halogen radicals by thermolysis or photolysis requires the addition of extra equipment such as furnaces or flash lamps.

A further problem of the gas dynamic chemical transfer laser is that the number of population is tied to the Boltzman distribution fraction of excited molecules. If this fraction could be increased the laser effect would be more marked and effective. Present systems, however, do not permit this increase.

SUMMARY OF THE INVENTION

Therefore, it is an object of this invention to provide a simplified gas dynamic-transfer chemical laser.

Also, it is an object of this invention to provide a gas dynamic-transfer chemical laser using a non-gaseous fuel and an oxidizer.

It is a further object of this invention to provide a laser which eliminates the necessity for extra equipment.

It is a still further object of this invention to a provide gas dynamic chemical transfer laser which increases the number of population inversions over the Boltzman distribution fraction.

These and other objects are met by injecting cold hydrogen or deuterium into a stream of combustion products formed by burning a halogenated or deuterated tetrazole with an oxidizer.

DESCRIPTION OF THE PREFERRED EMBODIMENTS

Cold deuterium or hydrogen is introduced at supersonic velocities into hot, expanded gases formed by combusting a halogenated or deuterated tetrazole.

Suitable tetrazoles and oxidizers are disclosed in the above referenced patent application of Lee et al. Upon burning, these form the gas stream into which $D_2$ and $H_2$ are injected. The tetrazoles, when burned produce hot $N_2-CO_2-DF-F-D_2O$ or $N_2-CO_2-HF-F-H_2O$ gases. These gases come from a hot combustion chamber at a stagnation pressure of about 10 atm and temperatures ranging from 1500° to 2500°K. Cold $D_2$ or $H_2$ is introduced at super sonic velocities into the hot expanding gases slightly downstream of the effective throat of a standard laser nozzle by means of a wing shaped injector located in the midplane. At that point, the $N_2-CO_2-DF-F.-D_2O$ or $N_2-CO_2-HF-F.-H_2O$ Mach number is of the order of 1.2. Comparable pressures and velocities of the two flows minimize the onset of shocks and permit their smooth mixing. Preferably cold means −25° to 25°C, although other temperatures are operable.

The hot $N_2-CO_2-15$ DF F.$-D_2O$ $N_2-CO_2-HF-F.-H_2O$ gases are rapidly expanded at supersonic velocities to preserve vibrational excitation within $N_2-CO_2-DF$ or $N_2-CO_2-HF$ molecules while reducing translational temperature. Mixing of the secondary stream of $D_2$ or $H_2$ with the primary stream, that contains fluorine atoms, is the essential feature of the hybrid gas dynamic transfer chemical laser. The pressure and temperature in the optical cavity should be of the order of 0.04 atm and 200° to 300°K, respectively. High laser power levels are possible with a high particle flux of lasing species through the optical cavity.

5-Trifluoromethyltetrazole is a suitable fuel for such a system. After combustion of 5-trifluoromethyltetrazole with air or $N_2O$, the supersonic exhaust gases containing (2F. $F_2$) are mixed with $D_2$ which react to form excited DF* that pumps the $CO_2$. This pumping augments the pumping by thermally excited DF* and $N_2*$ molecules.

The combustion products of 5-trifluoromethyltetrazole and air or $N_2O$ formulations with and without $H_2$ are presented in Table I. These combustion products were predicted by a standard rocket motor performance computer program.

The invention of the new hybrid Gas Dynamic-Transfer Chemical Laser allows one to pump the upper laser level of $CO_2$ to populations greater than those given by the Boltzman distribution fraction of molecules vibrationally excited at the combustor temperature and by resonance transfer from thermally excited $N_2$ and DF or HF molecules. The additional pumping occurs via excited DX or HX formed in chemical reactions $$F\cdot + D_2 \rightarrow DF^* + D\cdot \quad (1)$$

$$D\cdot + F_2 \rightarrow DX^* + F\cdot \quad (2)$$

or $$F\cdot + H_2 \rightarrow HF^* + H\cdot \quad (3)$$

and $$H\cdot + F_2 \rightarrow HX^* + F\cdot \quad (4)$$

This invention does not require high-voltage furnaces, photochemical equipment, compressed or cryogenic CO, $CO_2$, $N_2$, NO, $O_2$, $NF_3$, $SF_6$, $F_2$, $Cl_2$, $Br_2$ and He.

Other alternatives include (1) injection of $D_2$ or $H_2$ perpendicular rather than parallel to the supersonic flow of $N_2$—$CO_2$—DF—$F_2$—$D_2O$ or $N_2$—$CO_2$—HF—$F_2H_2O$, (2) injection of $D_2$ or $H_2$ prior to rather than simultaneously with the expansion of $N_2$—$CO_2$—D-F—F.—$D_2O$ or $N_2$—$CO_2$—HF—F.—$H_2O$.

TABLE I

PROPELLANT COMPOSITIONS AND THEORETICALLY COMPUTER REACTION PRODUCTS FOR 5-TRIFLUOROMETHYLETETRAZOLE (TFMT), HYDROGEN AND AIR OR NITROUS OXIDE AT 1000 PSI

| Components | Composition Percent (wt. %) | | | |
|---|---|---|---|---|
| | I | II | III | IV |
| TFMT* | 31.33 | 31.19 | 43.94 | 43.66 |
| Air | 68.67 | 68.36 | — | — |
| Nitrous Oxide | — | — | 56.06 | 55.70 |
| Hydrogen | — | 0.45 | — | 0.64 |
| GASEOUS REACTION PRODUCTS (MOLE %) | | | | |
| $CO_2$ | 13.37 | 12.06 | 17.06 | 9.89 |
| CO | — | 0.78 | 1.05 | 7.49 |
| $N_2$ | 69.96 | 67.40 | 54.21 | 51.22 |
| HF | 6.65 | 19.10 | 9.06 | 25.22 |
| $H_2O$ | — | — | — | 0.24 |
| F. | 6.83 | 0.16 | 17.83 | 0.85 |
| $F_2$ | 3.24 | — | 0.14 | — |
| H. | — | — | — | 0.07 |
| $H_2$ | — | — | — | 0.03 |
| NO. | — | 0.23 | 0.27 | 1.86 |
| $O_2$ | — | 0.27 | 0.40 | 2.26 |
| HO. | — | — | — | 0.32 |
| Total Moles of Gas | 3.411 | 3.519 | 3.515 | 3.639 |
| Chamber $T_r$ (° K) | 1526 | 2450 | 2476 | 3321 |

*5-trifluoromethyltetrazole

Charges of these laser fuels can be fired in rapid succession when a revolver/machine gun type arrangement is used. Firing of the charges is initiated by a standard means, e.g. a blasting cap. The propellant or explosive charge using the tetrazoles and oxidizer is formed either with or without a binder. Mechanical stability may be inherent from the fuel and oxidizer, or a binder may provide the stability. Suitable binders are listed in U.S. Pat. No. 3,375,230 to Oja et al. incorporated herein by reference. Depending on compatibility and physical condition of the ingredients, the charge can be premixed or mixed (injected) inside the combustion chamber.

The combustion products are then expanded through a supersonic nozzle, such as that described in U.S. Pat. No. 3,560,876 to Airey incorporated herein by reference, in order to produce the laser beam. Use of a nozzle usually requires that the combustion products be substantially gaseous. Modification of the laser producing system is required if solid products are part of the combustion gases.

Compatibility tests between the fuels and oxidizers are run using standard techniques. These tests are required because of the explosive nature and sensitivity of some compounds and mixtures thereof. In this manner, the safety of fuel and oxidizer combinations is determined.

Obviously numerous modifications and variations of the present invention are possible in light of the above teachings. It is therefore to be understood that, within the scope of the appended claims, the invention may be practiced otherwise than as specifically described.

What is claimed as new and desired to be secured by Letters Patent of the United States is:

1. In a method of producing a laser beam in a gas dynamic-transfer chemical laser which comprises the steps of subjecting a mixture of a fuel and an oxidizer to combustion in a combustion chamber to produce a mixture of gases consisting essentially of $N_2$, $CO_2$, HF, and F, expanding the mixture of gases through a supersonic nozzle, and passing the gas mixture through an optical cavity wherein stimulated emission of radiation from the gas molecules occurs the improvement wherein the fuel is 5-trifluoromethyltetrazole, and a secondary stream of cold $D_2$ or $H_2$ is injected into the expanded mixture of gases.

2. The method of claim 1 wherein the secondary stream is injected parallel to the combustion products.

3. The method of claim 1 wherein the secondary stream is injected perpendicular to the combustion products.

* * * * *